Sept. 26, 1933.  W. D. EGLINTON  1,928,172

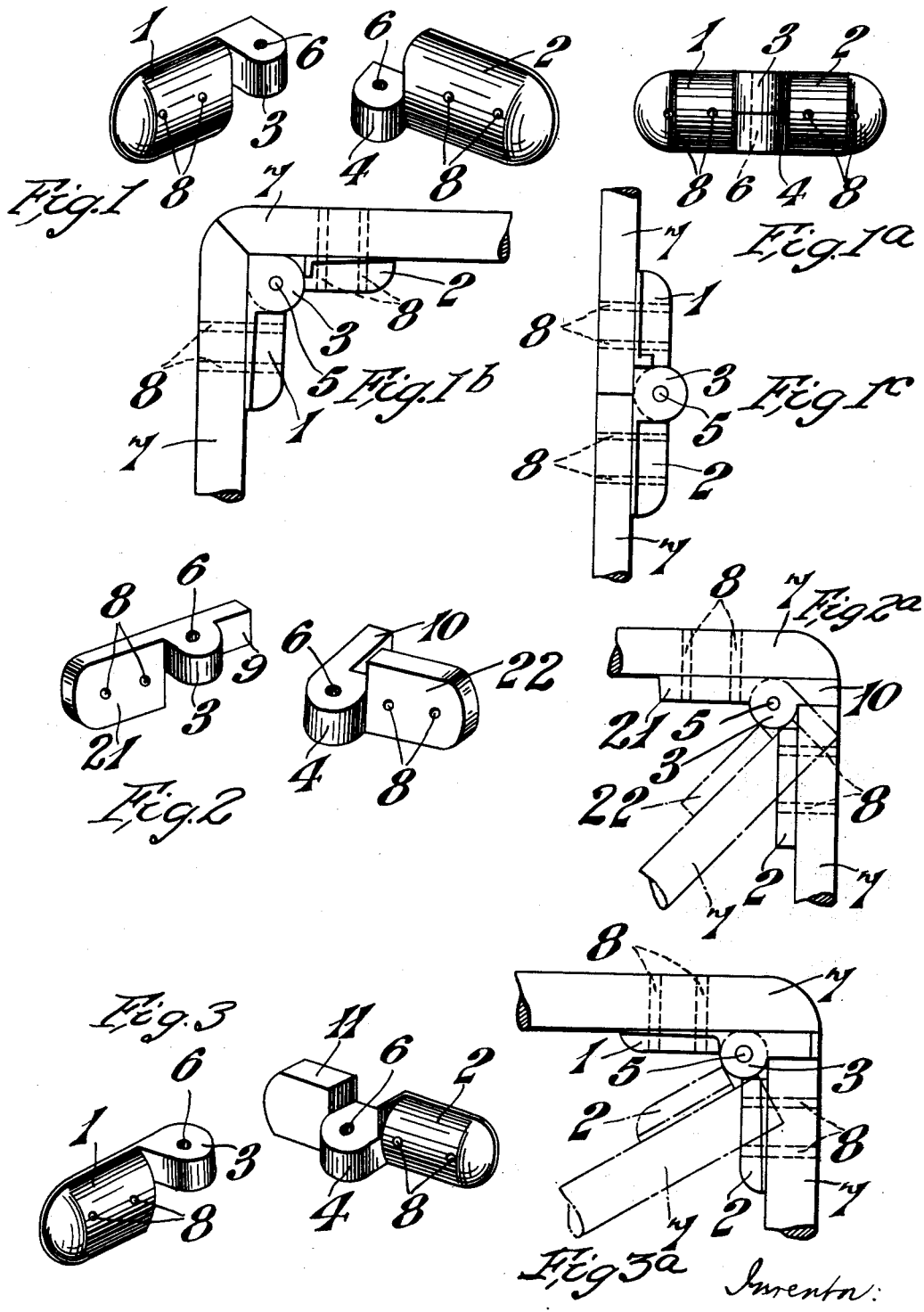

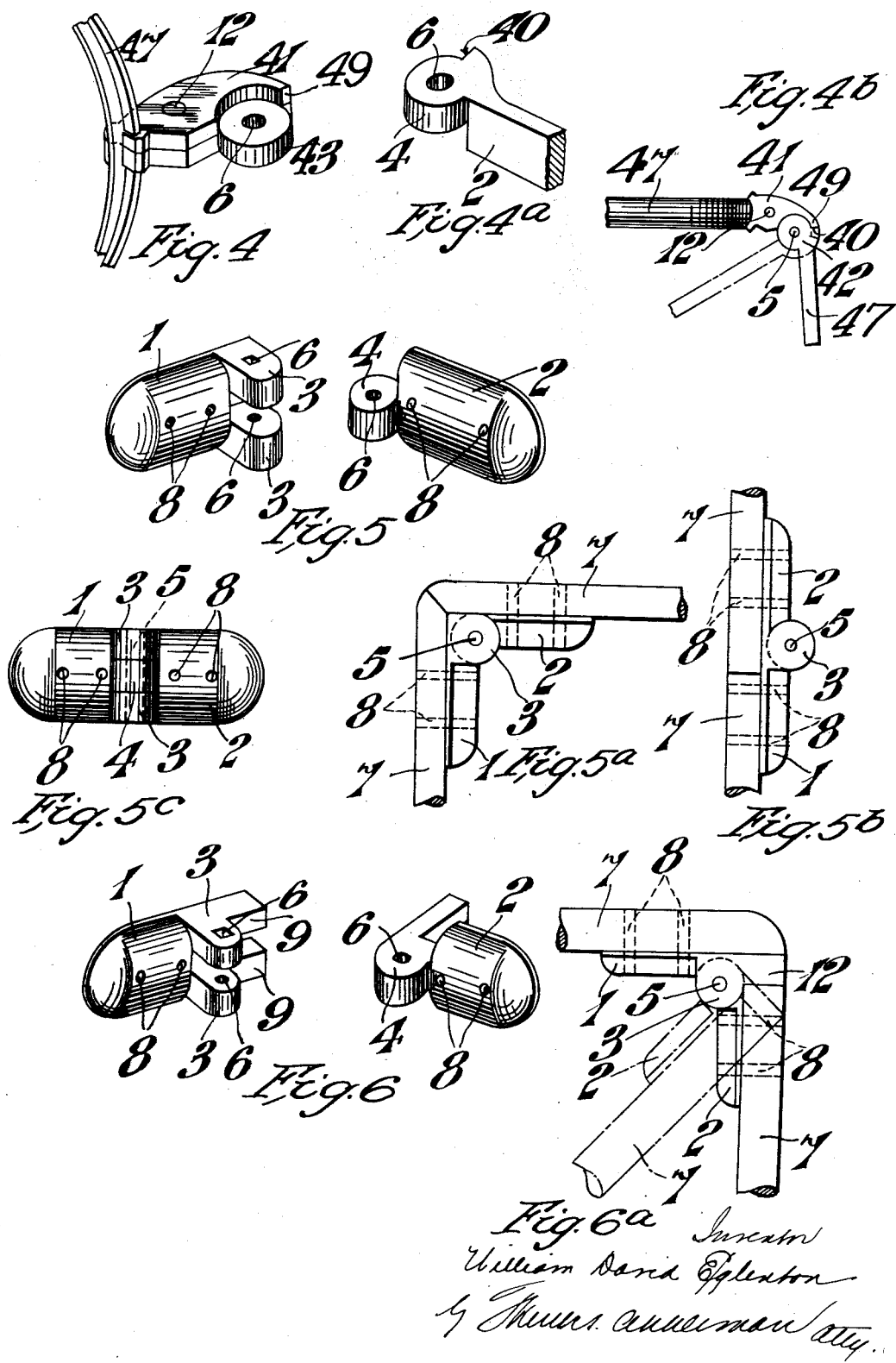

SPECTACLE FRAME HINGE

Filed April 11, 1930   3 Sheets-Sheet 3

Patented Sept. 26, 1933

1,928,172

UNITED STATES PATENT OFFICE 1,928,172

SPECTACLE FRAME HINGE

William David Eglinton, Croydon, England

Application April 11, 1930, Serial No. 443,440, and in Great Britain April 17, 1929

1 Claim. (Cl. 16—128)

This invention relates to spectacle frame hinges, and has for its object to provide an improved hinge which can be applied to various parts of a spectacle frame at which it may be found desirable to provide folding-up means.

Hinges for spectacles as at present constructed have their knuckles mounted above the surface of the fastening plates so that the plates are substantially tangential to them usually on opposite sides when the hinge is assembled. This causes a considerable gap between the sides or legs of the spectacle and the eye pieces when the spectacles are folded and necessitates a bulky case.

In order to get the spectacle sides or legs to lie flat upon the eye-pieces it has been suggested to form a hinge with the plates of the two parts of the hinge tangential to the same sides of the knuckles.

I accomplish the same object by a particular construction of hinge the characteristic feature of which is that the thickness of the fastening plates, or part of this thickness is used for the knuckles and the plate slotted or cut away to accommodate the interengaging knuckle or the other co-operating part of the hinge.

By this means the desired flatness when folded is secured with the fastening plates located on opposite sides of the interengaging knuckles according to normal practice.

The invention consists broadly therefore of a hinge for spectacles having its knuckles occupying the thickness or part of the thickness of the fastening plates, the fastening plates being slotted or cut away to accommodate the interengaging knuckle or knuckles of the co-operating part of the hinge, whereby when the two parts are folded together the opposing surfaces of the plates of the hinge lie flat one upon the other.

Reference is now directed to the accompanying drawings, wherein are illustrated to an enlarged scale various embodiments of spectacle frame hinges according to the invention in these drawings—

Figure 1 shows a two knuckle hinge in disassembled form, Fig. 1a shows the hinge when assembled, Fig. 1b shows the assembled hinge when attached to spectacle frames, and Fig. 1c shows the same hinge applied to a folding spectacle leg or side piece.

Figure 2 shows a modified two knuckle hinge disassembled, and Fig. 2a shows the hinge attached to a spectacle frame.

Figure 3 shows another modification of the two knuckle hinge in disassembled form and Fig. 3a shows this form of hinge attached to a spectacle frame.

Figure 4 shows one element of a further modification attached to the rim of a spectacle eye piece, Fig. 4a shows the other element of this hinge piece, and Fig. 4b shows the two parts disassembled.

Figure 8:
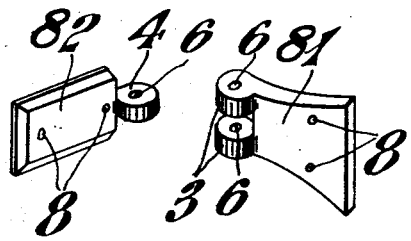
Figure 8A:
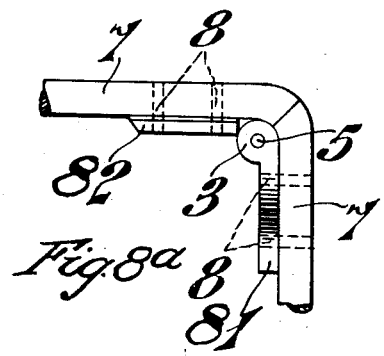
Figures 9, 9A:
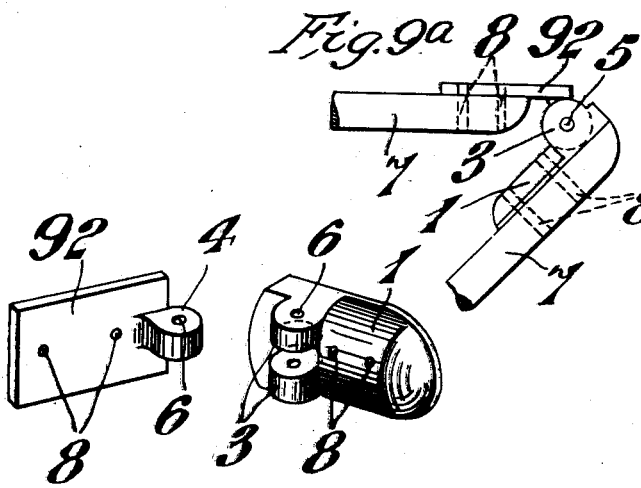
Figure 9B:
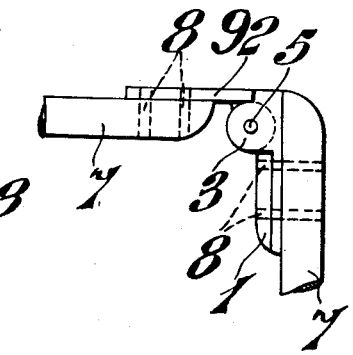

Figure 5 shows a three knuckle hinge according to the invention, Fig. 5a shows the hinge applied to a spectacle frame and Fig. 5b shows the hinge applied to a divided or folding leg of a spectacle. Fig. 5c is a view of the hinge parts shown in Fig. 5 assembled. Figs. 6 and 6a are views similar to Figs. 1 and 1a showing a modified three knuckle hinge. Figs. 7 and 7a, and 8 and 8a are similar views of further modifications of a three knuckle hinge and Figs. 9, 9a and 9b are similar views of a still further modification of the three knuckle form of hinge.

In these drawings 1 indicates one fastening plate and 2 the other, both plates having one of their sides a plane surface, while the other side of each, as in the particular examples shown may be convex or of any other desired configuration. The fastening plate 1 has one socket or knuckle 3 integral with it, and the other fastening plate 2 has one socket or knuckle 4 integral with it. The knuckles 3 and 4 are pivotally connected by a pin 5 which passes through the holes 6 in the knuckles.

The fastening plates 1 and 2 have the knuckles 3 and 4 at or near their ends, and the diameter or thickness of the knuckles 3 and 4 is substantially double that of the fastening plates 1 and 2. The flat sides of the fastening plates 1 and 2 are attached to a spectacle frame 7 by attaching pins or rivets passing through the holes 8 in the fastening plates 1 and 2 and spectacle frame 7. The knuckles 3 and 4 are on the sides of the fastening plates 1 and 2 other than those which contact with the spectacle frame.

When closed, the hinge, owing to the relative thickness of the fastening plates 1 and 2 and of the knuckles 3 and 4, folds into the smallest possible compass, the adjacent sides of the fastening plates lying flat against one another, the total thickness of the folded-up hinge being double that of one fastening plate, otherwise the diameter or thickness of a knuckle. It will thus be appreciated that the knuckles in nowise increase the thickness of the hinge when folded up.

The hinge shown in Figure 1 may be either attached to a portion of a spectacle frame which it is desired to open to an extent of 90° or it may be attached to a frame which it is desired to open to form a straight member, as shown in the drawings. The extent to which the hinge can be opened is regulated by the spectacle frame, which is so shaped at its ends adjacent the knuckles as to act as a stop to prevent opening beyond either 90° or 180° as the case may be.

On the fastening plate 21 of Figure 2 is a projection 9 which extends beyond and is of the same breadth as the knuckles 3, and is of the same thickness as the fastening plate 21, and extending laterally beyond the knuckle 4 of the fastening plate 22 is a projection 10 of similar dimensions to the projection 9. The hinge is attached to a spectacle frame 7 as shown in the drawings, and the hinge is shown by dotted lines, as in the act of being opened and, in full lines, as fully opened. When the hinge is fully opened to the extent of 90°, the inner surface of the projection 9 bears against the end of the spectacle frame 7 attached to the fastening plate 22, and the projection 10 bears against the spectacle frame attached to the fastening plate 21, the hinge being thus prevented from further opening movement.

The hinge illustrated in Figure 3 has an extension 11 on its fastening plate 2 of the same breadth and thickness as the fastening plate. Between the extension 11 and the fastening plate 2 is cut a recess in which the knuckle 3 of the shaped member 1 is adapted to fit. When attached to a spectacle frame and in open position the extension 11 bears against the end of the spectacle frame 7 which is attached to the fastening plate 1 and extended beyond the knuckle 3 thereof, and thus the hinge is prevented from opening beyond the extent of 90°.

The foregoing hinges while particularly suitable for application to frames of tortoiseshell and similar substances, can also be applied to metal frames.

In Figure 4 a modified hinge is shown applied to the front of a spectacle frame 47. The frame 47 illustrated is of metal, and the fastening plate 41 is attached to it by soldering, although rivets might equally well be used. The fastening plate 41 is in this instance made up of two parts held together by a screw or rivet 12, but may however be formed in one piece. At one end of the fastening plate 41 is a recess adapted to receive the spectacle frame, and towards the other extremity of the fastening plate 41 is the knuckle 43 and an adjacent shaped recess adapted to receive part of the knuckle 44 of the other shaped member 42. Extending beyond the knuckle 43 is a projection 49 and extending laterally adjacent the knuckle 44 is a stop 40. When the hinge is opened to the extent of 90°, the stop 40 abuts against the projection 49, and thus further opening movement of the hinge is prevented. The fastening plate 42 may be integral with the spectacle side-piece, or it may be attached thereto by soldering or riveting, should the spectacle frame be of material such as tortoiseshell.

Figure 7:
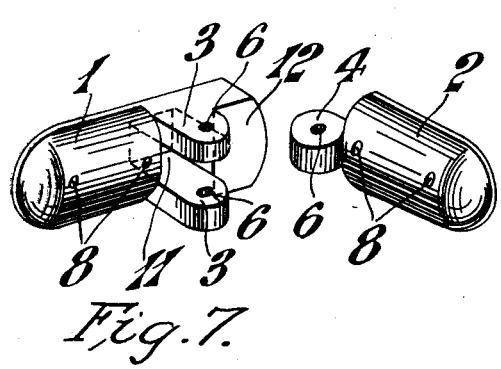
Figure 7A:
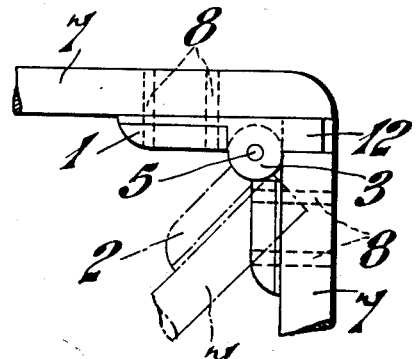

Figures 5, 6 and 7 will be understood upon reference to Figures 1, 2 and 3 as these figures show three knuckle hinges corresponding to the two knuckle hinges shown in the former figures, the reference numerals corresponding. Figure 8 only differs from Figure 5 is respect of the shape of the fastening plates 81 and 82 and Figure 9 is a slightly modified construction of the hinge shown in Figure 7, the fastening plate 91 being secured to the outside of the side-piece 7.

The invention is applicable to hinges for use at many positions of a spectacle or eye-glass frame at which it is desired to provide such hinging means, for instance at where the spectacle frame sides join the front, or when the sides are hinged intermediate their length, or in the region of the nosepiece in folding spectacles or eyeglasses.

The commendable features of frames fitted with hinges of the kind described herein is that the portions of the spectacle frame which are provided with the hinge always lie flat against each other and consequently take up much less room than when an ordinary hinge is used, and that there is no knuckle on the hinge which need be soldered on and which in consequence is liable to break away, so that the hinges are accordingly much stronger, besides being more simple to manufacture.

Although the embodiments of the invention described and illustrated herein show the knuckles as being integral with the fastening plates, they may, of course, be soldered on to the shaped portions without departing from the spirit of the invention.

What I claim and desire to secure by Letters Patent is:—

A spectacle hinge including a pair of hinge knuckles pinned together each having an attaching plate extending therefrom in one direction and of substantially twice the vertical dimensions of the knuckles and forming an abrupt shoulder with the horizontal face of the knuckle, the rear face of each knuckle being disposed in the same plane as the rear face of its attaching plate, one of said plates having its upper edge in the plane of the upper face of its knuckle and the other of said plates having its lower face in the plane of the lower face of its knuckle, one of said knuckles having a plate extending therefrom in alinement with the first plate and having its rear face in the plane of the rear face of said first plate and its knuckle, said second plate having its vertical dimension equal to that of its knuckle and the other knuckle having also a second plate of equal height with its knuckle and positioned at right angles to the first plate of said knuckle, the second plates being adapted to lie one on top of the other when the attaching plates are in right angular relation.

WILLIAM DAVID EGLINTON.